(12) United States Patent
Yu

(10) Patent No.: US 9,403,951 B2
(45) Date of Patent: Aug. 2, 2016

(54) FLAME-RETARDANT POLYESTER

(71) Applicant: ETERNAL MATERIALS CO., LTD., Kaohsiung (TW)

(72) Inventor: Pin-Chih Yu, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days.

(21) Appl. No.: 14/681,490

(22) Filed: Apr. 8, 2015

(65) Prior Publication Data

US 2015/0291740 A1    Oct. 15, 2015

(30) Foreign Application Priority Data

Apr. 9, 2014   (TW) .............................. 103113162 A

(51) Int. Cl.
| | | |
|---|---|---|
| C08G 63/02 | (2006.01) | |
| C08G 79/04 | (2006.01) | |
| C09D 167/06 | (2006.01) | |
| C08G 63/692 | (2006.01) | |
| C08G 63/91 | (2006.01) | |
| C08G 63/00 | (2006.01) | |

(52) U.S. Cl.
CPC ............ *C08G 79/04* (2013.01); *C08G 63/6928* (2013.01); *C08G 63/918* (2013.01); *C09D 167/06* (2013.01)

(58) Field of Classification Search
CPC ............................... C08G 79/04; C09D 167/06
USPC .......................... 528/166, 168, 169, 271, 272
See application file for complete search history.

(56) References Cited

PUBLICATIONS

Zhang et al., The synthesis and properties of a reactive flame-retardant unsaturated polyester resin from a phosphorus-containing diacid, Article first published online: Apr. 29, 2010, Polym. Bull. (2013) 70:1097-1111.*

Li-Ping Gao et al., A flame-retardant epoxy resin based on a reactive phosphorus-containing monomer of DODPP and its thermal and flame-retardant properties, Center for Degradable and Flame-Retardant Polymeric Materials, College of Chemistry, Polymer Degradation and Stability, vol. 93, Issue 7, Jul. 2008, pp. 1308-1315.*

* cited by examiner

*Primary Examiner* — Terressa Boykin
(74) *Attorney, Agent, or Firm* — Ladas & Parry LLP

(57) ABSTRACT

The present invention is directed to a flame-retardant polyester having a structure of formula (I):

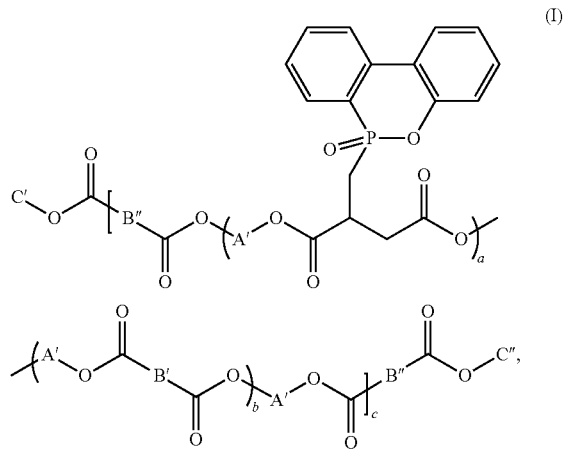

where each A' is, independently, a residue of a diol, each B' and each B" may be identical or different and are, independently, a residue of a saturated or unsaturated anhydride or acid, and C' and C" may be identical or different and are independently selected from hydrogen, a residue of an epoxy acrylate compound or a residue of an epoxy silicon-containing compound, with the proviso that C' and C" are not both hydrogen, where a is an integer of from 1 to 30, b is an integer of from 1 to 30, and c is an integer of from 1 to 15, and where the flame-retardant polyester has an acid value of from 20 to 40. The present invention is also directed to a process for preparing the flame-retardant polyester and a composition including the same.

9 Claims, No Drawings

FLAME-RETARDANT POLYESTER

BACKGROUND OF THE INVENTION

1. Field of the Invention

The present invention relates to a halogen-free reactive flame-retardant polyester, and more particularly to modified phosphorus-containing unsaturated polyester.

2. Description of the Related Art

It is known that flame retardants are roughly classified into halogen-based flame retardants, silicon-based flame retardants and phosphorus-based flame retardants, among which the halogen-based flame retardants have occupied an important position since the 20$^{th}$ century, because this type of flame retardants has good flame resistance, can be used in a low dosage, causes less impact on the performance of materials, and costs a moderate price. However, since halogen would cause environmental pollution problems, and furthermore, halogen-based flame-retardant polymer may generate a lot of smoke and corrosive gases in thermal cracking and burning, the prospect of the halogen-based flame retardants is cast with a shadow, and more and more users, especially in the electronics/electrical industry, are cautious about the halogen-based flame retardants. In recent years, due to the advantages of little smoke, having no toxicity, involving a small amount of halogen or being free of halogen, the phosphorus-based flame retardants have gradually replaced the halogen-based flame retardants and become an object that is extensively researched and developed in the industry. The compound

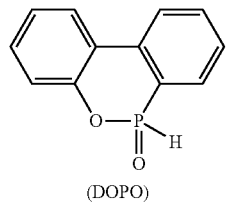 [SMILES: O=[PH]1Oc2ccccc2-c2ccccc21 ; "(DOPO)"]

(DOPO)

and derivatives thereof are a novel type of phosphorus-based flame retardants that have been rapidly developed in recent decades. Due to the special molecular structure, the compounds have better thermal stability and chemical stability than common non-cyclic organophosphates, and further, have the advantages of high carbon content, being free of halogen, little smoke, no toxicity, being non-migratory and persistent flame resistance. For example, US Patent Publication No. 2009/0198011 and Chinese Patent No. 101525420 B both disclose a flame retardant containing an ingredient 9,10-dihydro-9-oxa-10-phosphaphenanthrene-10-oxide (DOPO).

However, the compatibility of the flame retardant containing the ingredient DOPO with a non-polar solvent or a radiation-curable material (such as a vinyl material)/monomer (such as styrene) is poor. In practical application (for example, the application in a coating), the problem of compatibility occurs, thus easily resulting in problems such as that the distribution of the coating is not even after curing and the flame retardant material separates out, which make restrictions on the applications of the flame retardant.

Given the above, the present invention provides a modified phosphorus-containing unsaturated polyester that can be easily synthesized and conveniently mass-produced, has a radiation-curable group and has good compatibility with a radiation-curable material (such as a vinyl material)/monomer (such as styrene), and can be cross-linkedly polymerized with the radiation-curable material/monomer. Additionally, since the modified phosphorus-containing unsaturated polyester also exhibits good compatibility with a non-polar solvent, and can further reduce film shrinkage, this flame-retardant polyester has a wider spectrum of applications.

SUMMARY OF THE INVENTION

One objective of the present invention is to provide a flame-retardant polyester having a structure of Formula I:

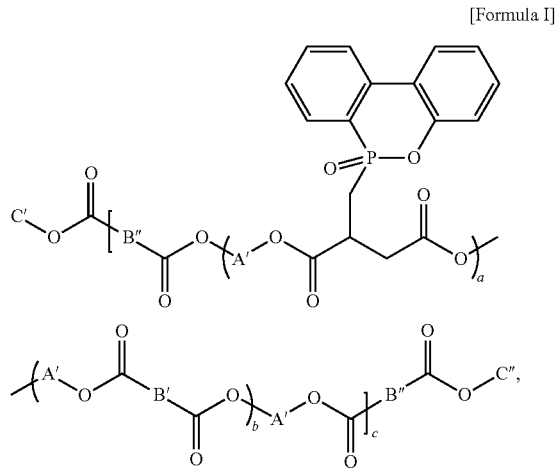

[Formula I]

wherein each A' is, independently, a residue of a diol, each B' and each B'' may be identical or different and are, independently, a residue of a saturated or unsaturated anhydride or acid, and C' and C'' may be identical or different and are independently selected from hydrogen, a residue of an epoxy acrylate compound or a residue of an epoxy silicon-containing compound, with the proviso that C' and C'' are not both hydrogen, wherein a is an integer of from 1 to 30, b is an integer of from 1 to 30, and c is an integer of from 1 to 15, and wherein the flame-retardant polyester has an acid value of from 20 to 40.

Another objective of the present invention is to provide a coating composition containing the flame-retardant polyester described above, a vinyl monomer and a polymerization initiator.

Still another objective of the present invention is to provide a method for preparing a flame-retardant polyester, which comprises the following steps:

(a) subjecting at least one diol, at least one saturated or unsaturated anhydride or acid, and

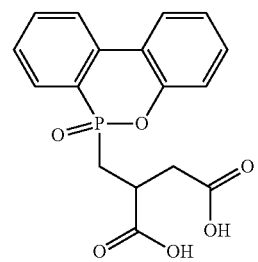 [SMILES: O=C(O)CC(CP1(=O)Oc2ccccc2-c2ccccc21)C(=O)O]

to a polymerization reaction;

(b) further reacting at least one saturated or unsaturated anhydride or acid with the product of Step (a);

(c) modifying the product of Step (b) with an epoxy acrylate compound or epoxy silicon-containing compound; and (d) after the reaction in Step (c) is completed, optionally adding an epoxy silicon-containing compound for modification.

In order to make the aforementioned objectives, technical features and advantages of the present invention comprehensible, embodiments of the present invention are further described below.

DETAILED DESCRIPTION OF THE PRESENT INVENTION

Some specific embodiments of the present invention are described in the following. However, the present invention can be implemented in various different manners without departing from the spirit of the present invention, and the protection scope of the present invention should not be construed as being limited to the description of this specification. Additionally, unless otherwise stated, "a(n)", "the" and similar terms used in this specification (especially in the appending claims) should be understood to include singular and plural forms.

The flame-retardant polyester of the present invention is obtained by polymerizing a diol, an unsaturated anhydride and/or unsaturated acid, a saturated anhydride and/or saturated acid and

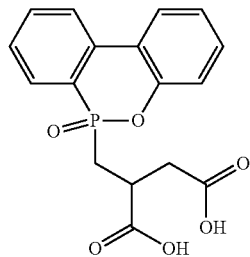 [SMILES: O=C(O)CC(CP1(=O)Oc2ccccc2-c2ccccc21)C(=O)O]

(10-(2,5-dicarboxypropyl)-9,10-dihydro-9-oxa-10-phosphaphenanthrene-10-oxide, monomer (D)), and modifying with an acrylate compound and/or epoxy silicon-containing compound. The flame-retardant polyester of the present invention is a modified phosphorus-containing unsaturated polyester, has an unsaturated bond (C=C) on the main chain, has radiation-curable characteristics (that is, being capable of forming a solid product through cross-linking polymerization under the action of ultraviolet light, visible light or high-energy rays), and is able to undergo a good cross-linking curing reaction with other radiation-curable materials. In addition, the resulting flame-retardant polyester has good compatibility with a commonly used monomer (such as styrene) or non-polar solvent for dilution, and thus provides a wider spectrum in practical applications. Furthermore, the flame-retardant polyester of the present invention can further contain "silicon," so the flame resistance of the material can be further improved by means of the retardant synergistic effect of phosphorus and silicon, and at the same time, the adhesion with the substrate (such as a glass substrate) to which the flame-retardant polyester of the present invention is applied can be improved.

According to the present invention, in Formula I, a is an integer of from 1 to 30, and preferably an integer of from 1 to 8, b is an integer of from 1 to 30, and preferably an integer of from 1 to 8, and c is an integer of from 1 to 15, preferably an integer of from 1 to 8, and more preferably an integer of from 1 to 4. If the values of a, b and c are excessively high, that is, the molecular weight is excessively high, operational problems may occur in subsequent applications (such as the application in a coating). For example, excessively high viscosity may be caused. Therefore, the values of a, b and c are generally selected according to needs in actual use.

The diol in the present invention may be any diol monomer, and the type is not particularly limited. For example, the diol (monomer (A)) may be selected from the group consisting of ethylene glycol, diethylene glycol, propylene glycol, dipropylene glycol, neopentyl glycol, polyethylene glycol, styrene diol, hexanediol, butanediol, 1-phenyl-1,2-ethylene glycol, 2-bromo-2-nitro-1,3-propylene glycol, 2-methyl-2-nitro-1,3-propylene glycol, diethyl bis(hydroxymethyl)malonate, hydroquinone and 3,6-dithio-1,8-octanediol and a combination thereof. In some specific embodiments of the present invention, the monomer (A) is ethylene glycol, diethylene glycol, propylene glycol, or a mixture thereof. A' is the residue derived from the monomer (A). Taking the monomer (A) being ethylene glycol (HO—$CH_2CH_2$—OH) for an example, the residue A' is —$CH_2CH_2$—.

The saturated or unsaturated anhydride or acid of the present invention is the general name for unsaturated anhydrides or unsaturated acids or saturated anhydrides or saturated acids. The saturated anhydride or acid of the present invention may be any saturated anhydride or acid monomer capable of forming a divalent group, and the type is not particularly limited. For example, the saturated anhydride or acid (monomer (B1)) is selected from the group consisting of phenylsuccinic acid, benzylmalonic acid, 3-phenylglutaric acid, 1,4-phenyldiacetic acid, 1,2-phenyldiacetic acid, oxalic acid, malonic acid, succinic acid, pyromellitic dianhydride, 3,3',4,4'-benzophenone-tetracarboxylic dianhydride, naphthalene dianhydride, 1,4,5,8-naphthalene-tetracarboxylic dianhydride, cyclobutane-tetracarboxylic dianhydride, 2,3-anthracene dicarboxylic anhydride, 3,4,9,10-tetracarboxylic anhydride, 1,2,3,4-butane-tetracarboxylic dianhydride, 1,2,3,4-cyclopentane-tetracarboxylic dianhydride, phenylglutaric anhydride, adipic anhydride, 3,3-dimethylglutaric anhydride, phenylsuccinic anhydride, hexahydrophthalic anhydride and a compound having a structure selected from the following:

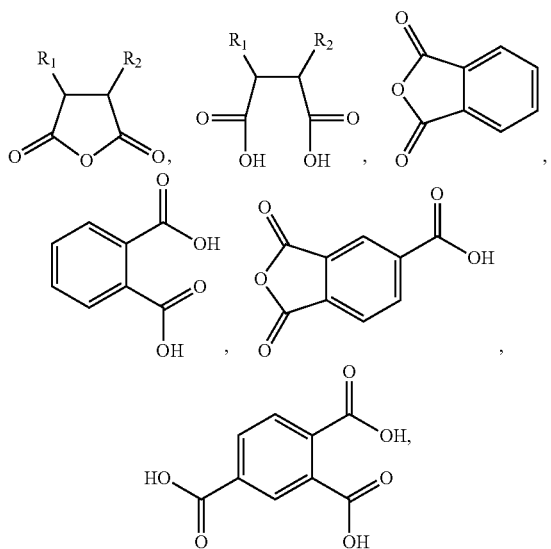

-continued

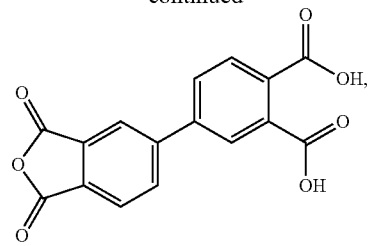

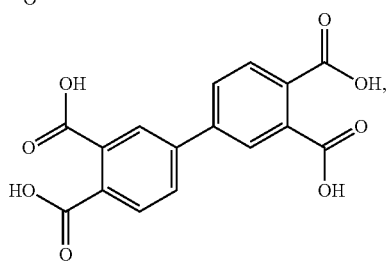

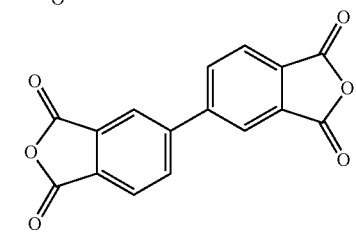

and a combination thereof, where $R_1$ and $R_2$ are, independently, H or a substituted or an unsubstituted C1 to C15 hydrocarbon radical. In some specific embodiments of the present invention, the saturated anhydride or acid may be

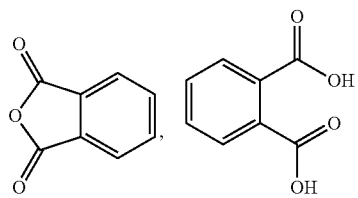

or a combination thereof.

The unsaturated anhydride or acid of the present invention may be any unsaturated anhydride or acid monomer capable of forming a divalent group, and the type is not particularly limited. For example, the unsaturated anhydride or acid (monomer (B2)) is selected from the group consisting of

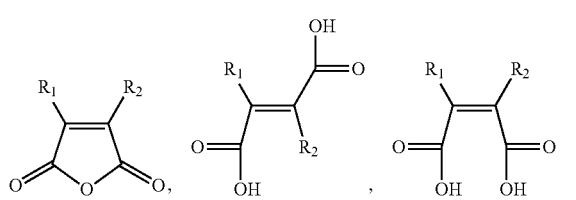

and a combination thereof, where $R_1$ and $R_2$ are, independently, H or a substituted or an unsubstituted C1 to C15 hydrocarbon radical. In some specific embodiments of the present invention, the unsaturated anhydride or acid may be maleic acid

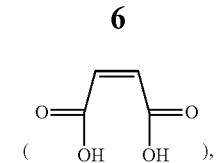

fumaric acid

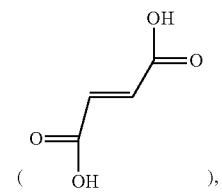

maleic anhydride

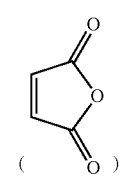

or a combination thereof.

In Formula I of the present invention, each B' and each B" may be identical or different, and are, independently, residues derived from a monomer (B1) or monomer (B2). Taking the situation that the monomer (B1) is

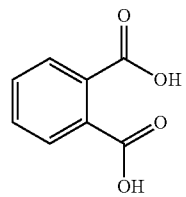 [SMILES: O=C(O)c1ccccc1C(=O)O]

as an example, the residue is

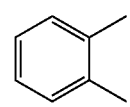

Taking the situation that the monomer (B2) is

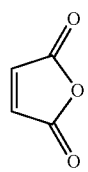

as an example, the residue is —CH═CH—. Each B' may be identical or different from each other, each B" may be identical or different from each other, and B' and B" also may be identical or different, according to the user's needs. Generally, when the flame retardant derived from the monomer (B1) is used in coatings, the coatings may have good mechanical strength, good heat resistance, but are prone to yellowing. When the flame retardant derived from the monomer (B2) is used in coatings, the coatings have a high curing rate, but are hard and brittle. Additionally, the side chain of the residue B' or residue B" preferably does not have an active group, such as the group $H_2C=CH-$, so as to prevent the modification of the unsaturated polyester from being influenced due to the existence of the active group (for example, prevent the generation of other undesired by-products).

In some specific embodiments of the present invention, each B' is a residue derived from the monomer (B1) or the monomer (B2), for example,

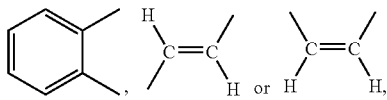

each B" is preferably a residue derived from the monomer (B2), for example,

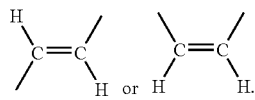

In Formula I of the present invention, C' and C" may be identical or different and are, independently, hydrogen, a residue of an epoxy acrylate compound (that is, a monomer (C1)) or a residue of an epoxy silicon-containing compound (that is, a monomer (C2)), but C' and C" are not both hydrogen. Taking the situation that the monomer (C1) is

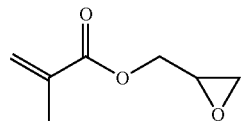

as an example, C' or C", the residue derived from the monomer (C1), is

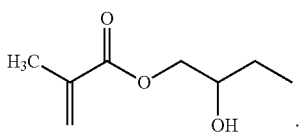

Taking the situation that the monomer (C2) is

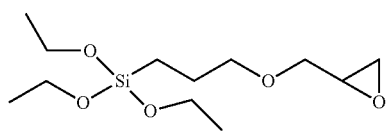 [SMILES: CCO[Si](CCCOCC1CO1)(OCC)OCC]

as an example, C' or C", the residue derived from the monomer (C2), is

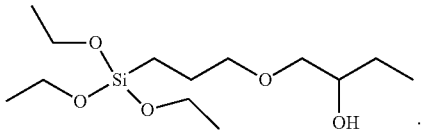 [SMILES: CCO[Si](CCCOCC(O)CC)(OCC)OCC]

The monomer (C1) may be glycidyl (meth)acrylate, 3,4-epoxycyclohexylmethyl(meth)acrylate or

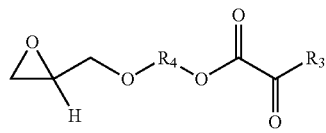

or a combination thereof, where $R_3$ is H or methyl, and $R_4$ is a unsubstituted divalent group or a divalent group substituted with a C1 to C15 alkyl group, aryl group, an ester group, a sulfonyl group, an isocyanate group, a silane group, a siloxane group or an acrylate group. According to a preferred embodiment of the present invention, $R_4$ is a C1 to C15 linear or branched alkylene group or a group selected from the group consisting of the following:

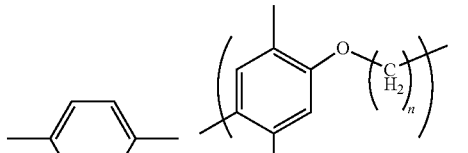

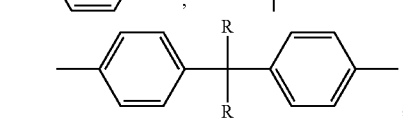

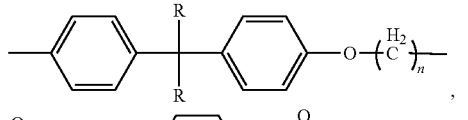

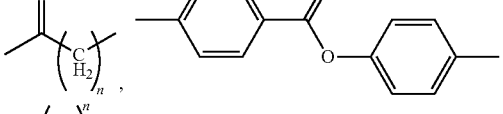

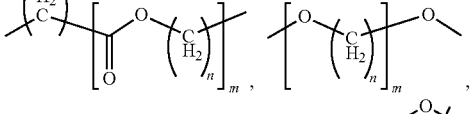

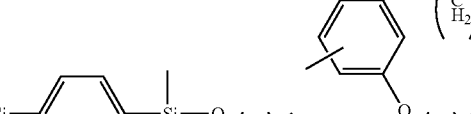

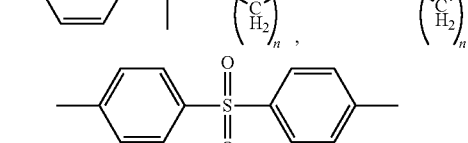

-continued

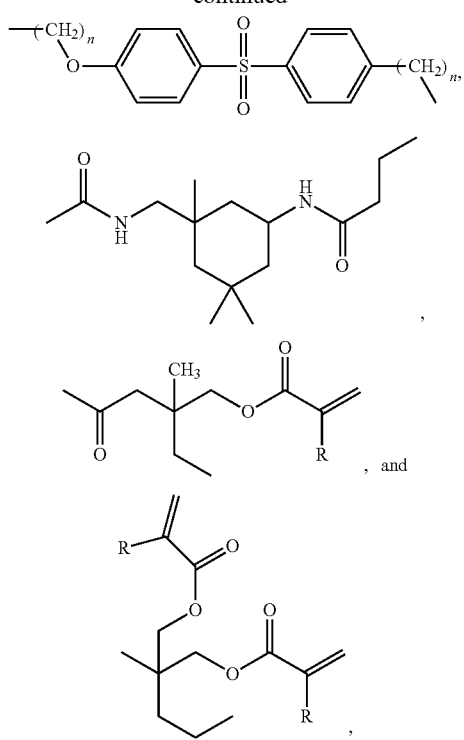

where n is an integer of from 1 to 15, m is an integer of from 1 to 10, R is H or methyl, and T is

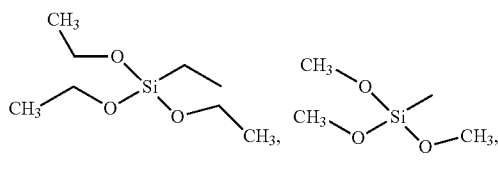

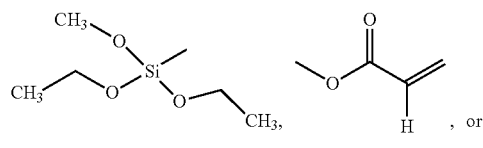

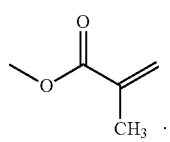, or

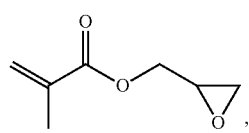

In some specific embodiments of the present invention, monomer (C1) is glycidyl methacrylate, that is, or 3,4-epoxy cyclohexylmethyl (meth)acrylate, that is,

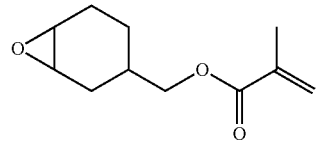

The epoxy silicon-containing compound monomer (C2) is, for example,

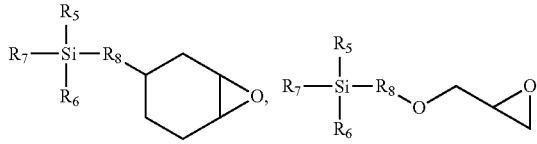

or a combination thereof, where $R_5$ and $R_6$ are, independently, a C1 to C15 linear or branched alkyl group, a C1 to C15 linear or branched alkoxy group or

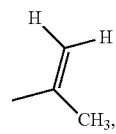

$R_7$ is a C1 to C15 linear or branched alkyl group, a C1 to C15 linear or branched alkoxy group or

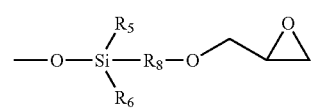, $R_8$ is a C1 to C15 linear or branched alkylene group, a polyether group, or an arylene group. Preferably, the monomer (C2) is

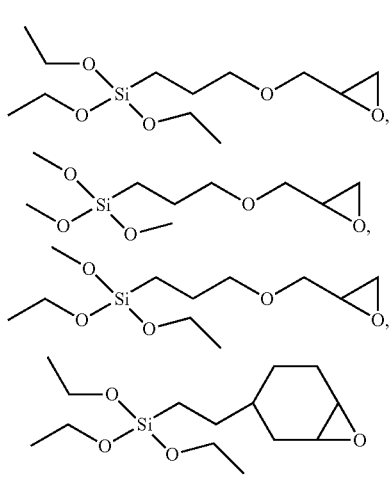

or a combination thereof. In some specific embodiments of the present invention, the monomer (C2) is

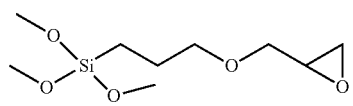

(3-glycidoxypropyltrimethoxysilane) or

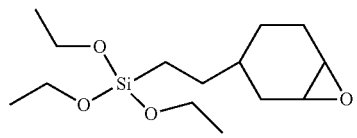 [SMILES: CCO[Si](CCC1CCC2OC2C1)(OCC)OCC]

(2-(3,4-epoxycyclohexyl)ethyltriethoxysilane).

As for currently commercially available flame retardants containing DOPO, since the flame retardants containing DOPO do not have an active group, the flame retardants have poor compatibility with a non-polar solvent or a radiation-curable material (such as a vinyl material)/monomer (such as styrene), thus easily resulting in problems such as the uneven distribution of the coating after curing or the separation of the flame retardant material. The present invention utilizes the epoxy acrylate compound (that is, a monomer (C1)) to modify the polyester having the structure of Formula III, phosphorus, so as to further improve the flame resistance of the material by means of the flame retardant synergy of silicon and phosphorus. When being applied in coatings, the flame retardant modified with the epoxy silicon-containing compound would have good adhesion with the substrate due to the presence of the silicon-oxygen functional group. In a preferred embodiment, at least one of C' and C" is

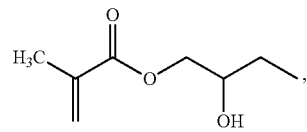

and the other one of C' and C" is selected from the group consisting of H,

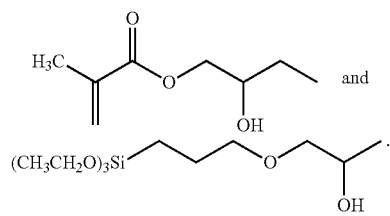

[Formula III]

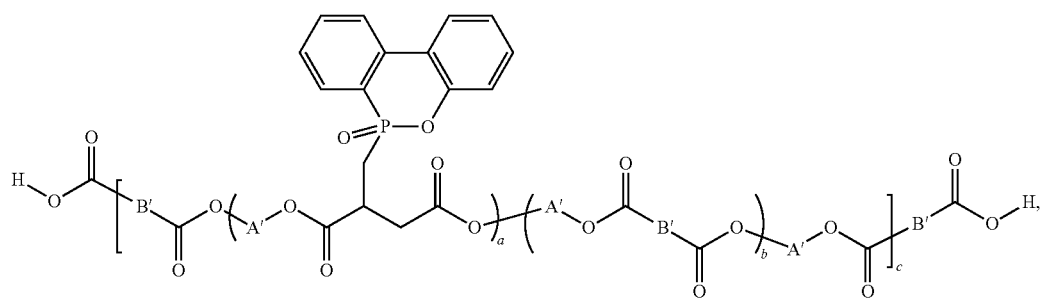

wherein the residue A', the residue B' and the residue B", and the numbers of polymerized units a, b and c are the same as described above. It is characterized in that the monomer (C1) has an active functional group, such as, epoxy, and the active functional group can form a chemical bonding with an acid functional group at the terminal of the polyester, so that the polyester having the structure of Formula III is changed into a reactive polyester. The reactive polyester can participate in a polymerization reaction, and is embedded into the molecular structure of a polymer, thereby avoiding migration. Therefore, when the reactive polyester is used in coatings, it has the advantages of good compatibility, and after curing, the flame retardant is uniformly distributed and will not separate out.

The flame-retardant polyester having the structure of Formula III is modified by the monomer (C1), so as to have a reactive functional group, such as vinyl. During the modification, the acid functional group (carboxyl) may be remained, and the polyester optionally can be modified with an epoxy silicon-containing compound (that is, the monomer (C2)) to generate an unsaturated polyester containing both silicon and The ratio of the number of moles of the used epoxy silicon-containing compound (C2) and the number of moles of the monomer (C1) for polymerization is preferably 1:99 to 1:5. In some preferred embodiments, the ratio range is, for example, but not limited to, 1:99 to 1:90, 1:80 to 1:65, and 1:45 to 1:15. The ratio is selected according to the number of alkoxy groups of the used epoxy silicon-containing compound. The selection of the ratio may influence on: (1) the improvement of the flame resistance, (2) the improvement of the adhesion with a specific substrate (for example, a composite material, glass fiber or glass base material), and (3) the provision of a suitable cross-linking density for improving the flexibility of a plastic material after forming a film.

The flame-retardant polyester having the structure of Formula I of the present invention can be obtained through a method comprising the following steps:

(a) subjecting at least one diol, at least one saturated or unsaturated anhydride or acid, and

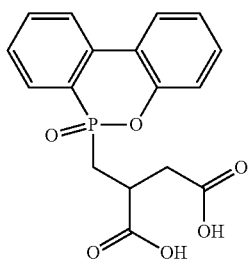 [SMILES: O=C(O)CC(CP1(=O)Oc2ccccc2-c2ccccc21)C(=O)O]

to a polymerization reaction;

(b) further reacting at least one saturated or unsaturated anhydride or acid with the product of Step (a);

(c) modifying the product of Step (b) with an epoxy acrylate compound or epoxy silicon-containing compound; and (d) after the reaction in Step (c) is completed, optionally adding an epoxy silicon-containing compound for modification.

Preferably, in Step (b), at least one unsaturated anhydride or acid is used to react with the product of Step (a). Preferably, in Step (c), the product of Step (b) is modified by an epoxy acrylate compound.

The product obtained in Step (a) can be expressed by Formula II:

[Formula II]

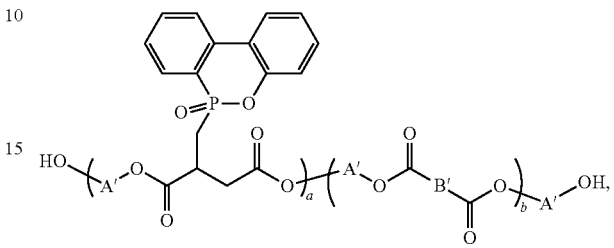

wherein the residue A', the residue B', and the numbers of polymerized units a and b are as described above.

The product obtained in Step (b) can be expressed by Formula III:

[Formula III]

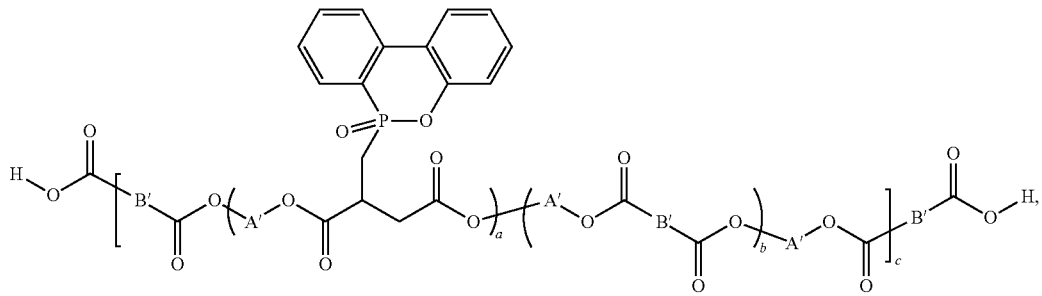

wherein the residue A', the residue B' and the residue B", and the numbers of polymerized units a, b and c are as described above.

The product obtained in Step (c) can be expressed by Formula I:

[Formula I]

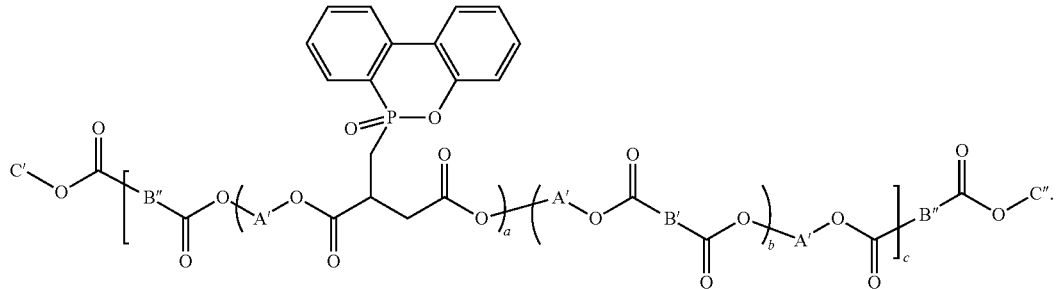

Taking the situation that the epoxy acrylate compound in Step (c) is glycidyl methacrylate as an example, the product of Formula IV-1 below can be obtained:

[Formula IV-1]

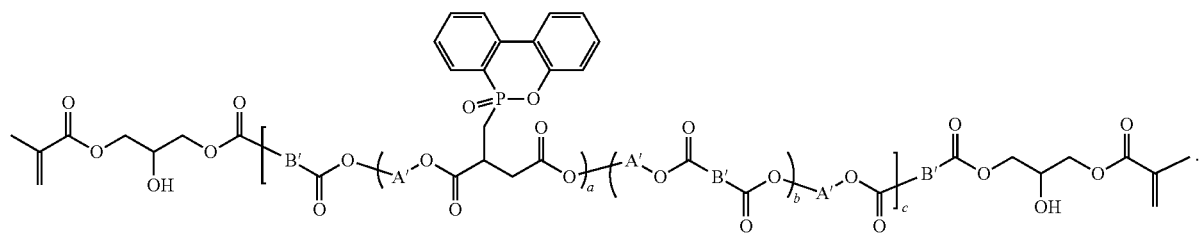

After Step (c) is completed, optionally, an epoxy silicon-containing compound is added to react with an unreacted carboxyl. For example, when the epoxy acrylate compound is

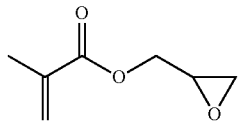

and the epoxy silicon-containing compound is

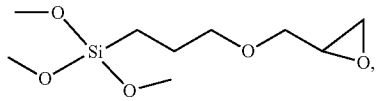

the product of Formula IV-2 below can be obtained:

the viscosity range of the resulting phosphorus-containing unsaturated polyester is preferably G-Z (detected by a GARDNER viscosity meter), for example, may be, G-H, I-J, K-L, M-N, O-P, Q-R, R-S, T-U, V-W, W-X or X-Y. As for the acid value, the acid value range of the flame-retardant polyester of the present invention is not greater than 40. If the acid value is greater than 40, gelation easily occurs for the prepared polyester. Therefore, in order to obtain a product with good stability, storage stability and coating operability, the acid value range of the flame-retardant polyester is preferably controlled to be 20 to 40. In addition, the phosphorus content of the flame-retardant polyester can be adjusted according to the requirements for flame resistance by persons of ordinary skill in the art, and is not particularly limited. For example, in general, if it is required to provide flame resistance equivalent to level UL-94 V0, the phosphorus content at least is 1.5% or more, preferably 2.0% or more, and more preferably 2.5% or more, based on the total weight of the unsaturated polyester. In some preferred embodiments, the phosphorus content range of the flame-retardant polyester is 2.5% to 8%, for example, but not limited to, 3.0%, 3.6%, 4% and 5%.

[Formula IV-2]

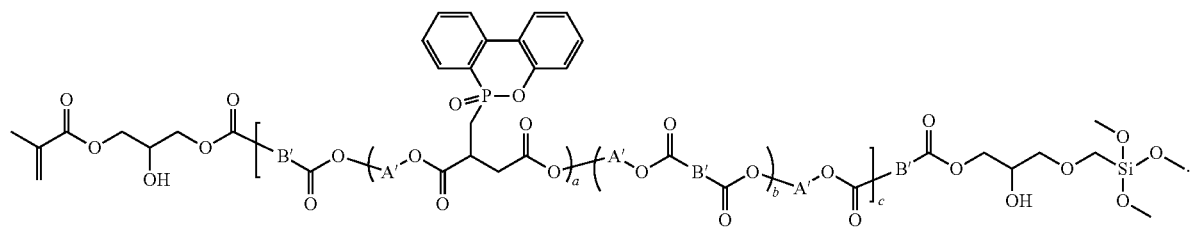

After the optional Step (d) is completed, carboxyl group may be still remained. Therefore, in the obtained product of Formula I, the residue C' and the residue C''' may be identical or different, and are, independently, hydrogen, a residue of an epoxy acrylate compound or a residue of an epoxy silicon-containing compound. Moreover, in order to achieve the modification, C' and C''' are not both hydrogen.

According to the method for preparing the flame-retardant polyester of the present invention, by using the monomer (D) as the reactant, compared to the process using DOPO as the reactant, a flame-retardant polyester having a higher phosphorus content can be obtained, thus achieving good flame resistance.

In the method of the present invention, the temperature range of the polymerization reaction may be determined according to the selected reaction raw material; while the time In the flame-retardant polyester having the structure of Formula I of the present invention, the amounts of the monomers preferably meet the following conditions for desired stability and applicability of the resulting product: the ratio of the number of moles of the monomer (A) to the total number of moles of the monomers (B1), (B2) and (C2) is 10:1 to 1:10, preferably 1:0.5 to 1:0.9, and more preferably 1:0.6 to 1:0.8; the ratio of the number of moles of the monomer (C1) to the number of moles of the polymer obtained by the polymerization of the monomers (A), (B1), (B2) and (C2) is 1:0.01 to 1:1.2, preferably 1:0.05 to 1:0.5, and more preferably 1:0.1 to 1:0.3; and the ratio of the number of moles of the monomers (B1) and (B2) to the number of moles of the monomer (C2) is 10:1 to 1:10, preferably 5:1 to 1:5, and more preferably 3:2 to 2:3.

The flame-retardant polyester of the present invention has the advantages of being radiation-curable, good compatibility with a non-polar solvent or monomer (such as styrene), and good adhesion with a substrate, and can be widely used for flame retardance, coating, pigment (such as inorganic powders) dispersion and adhesion promotion.

Therefore, the present invention further provides a coating composition, which comprises: a flame-retardant polyester having the structure of Formula I, a vinyl monomer and a polymerization initiator. The polymerization initiator (such as a photoinitiator) is used to make the vinyl monomer and the unsaturated polyester contained in the composition undergo cross-linking polymerization (such as UV photo-polymerization) to form a solid product. Based on the total weight of the coating composition, the amount of the vinyl monomer is 0% to 60%, preferably 0% to 55%, and more preferably 10% to 40%, but not limited thereto; the amount of the polymerization initiator is not particularly limited, provided that the amount is sufficient to initiate the polymerization reaction. Based on the total weight of the coating composition, the amount of the flame-retardant polyester is 40% to 100%, preferably 45% to 99.9%, and more preferably 60% to 90%, but not limited thereto.

In the coating composition of the present invention, the type of the vinyl monomer includes, but not limited to, a (meth)acrylic monomer, a monofunctional or multifunctional (meth)acrylate monomer, or a mixture thereof, with (meth) acrylate monomer being preferred. The monofunctional (meth)acrylate monomer may be selected from, for example, but not limited to, the group consisting of: methyl methacrylate (MMA), butyl methacrylate, 2-phenoxy ethyl acrylate, ethoxylated 2-phenoxy ethyl acrylate, 2-(2-ethoxyethoxy) ethyl acrylate, cyclic trimethylolpropane formal acrylate, carboxyethyl acrylate, 3,3,5-trimethyl cyclohexane acrylate, ortho-phenyl phenoxy ethyl acrylate, cumyl phenoxyl ethyl acrylate, lauryl methacrylate, isooctyl acrylate, stearyl methacrylate, isodecyl acrylate, isobornyl methacrylate, benzyl acrylate, 2-hydroxyethyl metharcrylate phosphate, caprolactone acrylate, hydroxyethyl acrylate (HEA), 2-hydroxyethyl methacrylate (HEMA) and a mixture thereof. The multifunctional (meth)acrylate monomer may be selected from, for example, but not limited to, the group consisting of: hydroxypivalyl hydroxypivalate diacrylate, 1,6-hexanediol diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl)isocyanurate triacrylate, pentaerythritol triacrylate, ethoxylated trimethylolpropane triacrylate, propoxylated trimethylolpropane triacrylate), trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, dipentaerythritol hexaacrylate, tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylolpropane trimethacrylate, propoxylated glycerol trimethacrylate, tris(acryloxyethyl)isocyanurate, trimethylolpropane triacrylate and a mixture thereof. Preferably, the vinyl monomer is 2-phenoxy ethyl acrylate, lauryl methacrylate, isodecyl acrylate, isobornyl methacrylate, trimethylolpropane trimethacrylate, pentaerythritol tetraacrylate, ethoxylated trimethylol propane trimethacrylate, propoxylated glycerol trimethacrylate, trimethylolpropane triacrylate and a mixture thereof. Commercially available vinyl monomers that can be used in the present invention include the products manufactured by Eternal Corporation with the trade names of EM223, EM328, EM2308, EM231, EM219, EM90, EM70, EM235, EM2381, EM2382, EM2383, EM2384, EM2385, EM2386, EM2387, EM331, EM3380, EM241, EM2411, EM242, EM2421 and EM265.

Optionally, the coating composition of the present invention may further comprise other conventional coating ingredients or additives, for example, silicone compounds, clay, defoamers, leveling agents, light stabilizers, antistatic agents, ultraviolet absorbents, reactive fillers, non-reactive fillers, reactive softeners, elastomers or diluents. The adding method and amount of the conventional coating ingredients or additives can be optionally adjusted according to general knowledge by persons of ordinary skill in the art after reading the disclosure of the specification, and is not particularly limited.

The present invention is further illustrated with the following examples.

EXAMPLES

Example 1

Preparation of a Flame-Retardant Polyester of Formula IV-1 (Silicon-Free)

First, 627 g of diethylene glycol and 122 g of dipropylene glycol were added into a 3 L round-bottomed reaction flask, and stirred for 30 min at 70° C. Then, 276 g of maleic anhydride (that is, a monomer (B2)) and 1809 g of 10-(2,5-dicarboxypropyl)-9,10-dihydro-9-oxa-10-phosphaphenanthrene-10-oxide were added into the reaction flask in batches, and reacted at 200° C. till the acid value was 65 to 75 and the viscosity was 550 to 650 (detected by a high-temperature viscosity meter, #3, 150° C., 750 rpm). Next, 0.165 g of 1,4-dihydroxy benzene was added to the reaction flask, 323 g of glycidyl methacrylate was added dropwise at 70° C., and then, the temperature was raised to 95° C. and maintained at a constant temperature of 95° C. for 3 h, and the reactants were reacted till the acid value was 25 to 30, and the viscosity was 750 to 850 (detected by a high-temperature viscosity meter, #3, 150° C., 750 rpm) and the viscosity in 35% styrene was V-W (detected by a GARDNER viscosity meter). The acrylate-modified flame-retardant polyester having the structure of Formula IV-1 was thus obtained. The phosphorus content of the flame-retardant polyester was determined to be 3.8%.

Example 2

Preparation of a Composition of Flame-Retardant Polyesters having the Structures of Formulas IV-1 and IV-2

First, 627 g of diethylene glycol and 122 g of propylene glycol were added to a 3 L round-bottomed reaction flask, and stirred for 30 min at 70° C. Then, 276 g of maleic anhydride (that is, a monomer (B2)) and 1809 g of 10-(2,5-dicarboxypropyl)-9,10-dihydro-9-oxa-10-phosphaphenanthrene-10-oxide were added into the reaction flask in batches, and reacted at 200° C. till the acid value was 65 to 75 and the viscosity was 550 to 650 (detected by a high-temperature viscosity meter, #3, 150° C., 750 rpm). Next, 0.165 g of 1,4-dihydroxy benzene was added to the reaction flask, 323 g of glycidyl methacrylate was added dropwise at 70° C., and then, the temperature was raised to 95° C. and maintained at a constant temperature of 95° C. for 3 h, and the reactants were reacted till the acid value was 25 to 30, and the viscosity was 750 to 850 (detected by a high-temperature viscosity meter, #3, 150° C., 750 rpm) and the viscosity in 35% styrene was V-W (detected by a GARDNER viscosity meter). Then, the temperature of the reaction flask was decreased to 45° C., and next, 60 g of 3-glycidoxypropyltrimethoxysilane was added dropwise into the reaction flask, and the reactants were reacted for 2 h till the acid value was 15 to 20 and the viscosity in 35% styrene was X-Y (detected by a GARDNER viscosity meter). The composition of modified flame-retardant polyesters having the structures of Formulas IV-1 and IV-2 was thus obtained. The phosphorus content of the flame-retardant polyesters was determined to be 3.73%.

Example 3

Preparation of a Flame-Retardant Polyester of Formula I (Silicon-Free)

First, 62.7 g of diethylene glycol and 12.2 g of propylene glycol were added into a 3 L round-bottomed reaction flask, and stirred for 30 min at 70° C. Then, 27.6 g of maleic anhydride (that is, a monomer (B2)) and 180.9 g of 10-(2,5-dicarboxypropyl)-9,10-dihydro-9-oxa-10-phosphaphenanthrene-10-oxide were added into the reaction flask in batches, and reacted at 200° C. till the acid value was 65 to 75 and the viscosity was 550 to 650 (detected by a high-temperature viscosity meter, #3, 150° C., 750 rpm). Next, 0.165 g of 1,4-dihydroxy benzene was added to the reaction flask, 45.5 g of acrylate hydroxybutyl glycidyl ether was added dropwise at 70° C., and then, the temperature was raised to 95° C. and maintained at a constant temperature of 95° C. for 3 h, and the reactants were reacted till the acid value was 25 to 30, and the viscosity was 750 to 850 (detected by a high-temperature viscosity meter, #3, 150° C., 750 rpm) and the viscosity in 35% styrene was V-W (detected by a GARDNER viscosity meter). The acrylate-modified flame-retardant polyester having the structure of Formula I was thus obtained. The phosphorus content of the flame-retardant polyester was determined to be 3.65%.

Example 4

Preparation of a Composition of a Flame-Retardant Polyester having the Structure of Formula I First, 62.7 g of diethylene glycol and 12.2 g of propylene glycol were added into a 3 L round-bottomed reaction flask, and stirred for 30 min at 70° C. Then, 27.6 g of maleic anhydride (that is, a monomer (B2)) and 180.9 g of 10-(2,5-dicarboxypropyl)-9,10-dihydro-9-oxa-10-phosphaphenanthrene-10-oxide were added into the reaction flask in batches, and reacted at 200° C. till the acid value was 65 to 75 and the viscosity was 550 to 650 (detected by a high-temperature viscosity meter, #3, 150° C., 750 rpm). Next, 0.165 g of 1,4-dihydroxy benzene was added to the reaction flask, 45.5 g of acrylate hydroxybutyl glycidyl ether was added dropwise at 70° C., and then, the temperature was raised to 95° C. and maintained at a constant temperature of 95° C. for 3 h, and the reactants were reacted till the acid value was 25 to 30, and the viscosity was 750 to 850 (detected by a high-temperature viscosity meter, #3, 150° C., 750 rpm) and the viscosity in 35% styrene was V-W (detected by a GARDNER viscosity meter). Then, the temperature of the reaction flask was decreased to 45° C., and next, 6.0 g of 3-glycidoxypropyltrimethoxysilane was added dropwise into the reaction flask, and the reactants were reacted for 2 h till the acid value was 15 to 20 and the viscosity in 35% styrene was X-Y (detected by a GARDNER viscosity meter). The composition of modified flame-retardant polyesters having the structure of Formula I was thus obtained. The phosphorus content of the flame-retardant polyester was determined to be 3.58%.

Example 5

Preparation of a Flame-Retardant Polyester of Formula IV-1 (Silicon-Free)

First, 627 g of diethylene glycol and 122 g of propylene glycol were added to a 3 L round-bottomed reaction flask, and stirred for 30 min at 70° C. Then, 148.1 g of phthalic anhydride

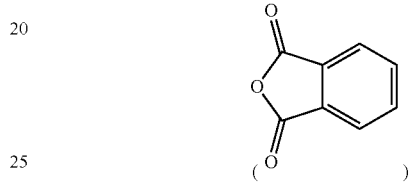

(that is, a monomer (B1)), 178 g of maleic anhydride (that is, a monomer (B2)) and 1809 g of 10-(2,5-dicarboxypropyl)-9,10-dihydro-9-oxa-10-phosphaphenanthrene-10-oxide were added into the reaction flask in batches, and reacted at 200° C. till the acid value was 65 to 75 and the viscosity was 550 to 650 (detected by a high-temperature viscosity meter, #3, 150° C., 750 rpm). Next, 0.165 g of 1,4-dihydroxy benzene was added to the reaction flask, 323 g of glycidyl methacrylate was added dropwise at 70° C., and then, the temperature was raised to 95° C. and maintained at a constant temperature of 95° C. for 3 h, and the reactants were reacted till the acid value was 25 to 30, and the viscosity was 750 to 850 (detected by a high-temperature viscosity meter, #3, 150° C., 750 rpm) and the viscosity in 35% styrene was V-W (detected by a GARDNER viscosity meter). The acrylate-modified flame-retardant polyester having the structure of Formula IV-1 was thus obtained. The phosphorus content of the flame-retardant polyester was determined to be 3.7%.

Example 6

Preparation of a Composition of Flame-Retardant Polyesters having the Structures of Formulae IV-1 and IV-2

First, 627 g of diethylene glycol and 122 g of propylene glycol were added to a 3 L round-bottomed reaction flask, and stirred for 30 min at 70° C. Then, 148.1 g of phthalic anhydride (that is, a monomer (B1)), 178 g of maleic anhydride (that is, a monomer (B2)) and 1809 g of 10-(2,5-dicarboxypropyl)-9,10-dihydro-9-oxa-10-phosphaphenanthrene-10-oxide were added into the reaction flask in batches, and reacted at 200° C. till the acid value was 65 to 75 and the viscosity was 550 to 650 (detected by a high-temperature viscosity meter, #3, 150° C., 750 rpm). Next, 0.165 g of 1,4-dihydroxy benzene was added to the reaction flask, 323 g of glycidyl methacrylate was added dropwise at 70° C., and then, the temperature was raised to 95° C. and maintained at a constant temperature of 95° C. for 3 h, and the reactants were reacted till the acid value was 25 to 30, and the viscosity was 750 to 850 (detected by a high-temperature viscosity meter, #3, 150° C., 750 rpm) and the viscosity in 35% styrene was V-W (detected by a GARDNER viscosity meter). Then, the temperature of the reaction flask was decreased to 45° C., and next, 60 g of 3-glycidoxypropyltrimethoxysilane was added dropwise into the reaction flask, and the reactants were reacted for 2 h till the acid value was 15 to 20 and the viscosity in 35% styrene was X-Y (detected by a GARDNER viscosity meter). The composition of modified flame-retardant polyesters having the structures of Formulae IV-1 and IV-2 was thus obtained. The phosphorus content of the flame-retardant polyesters was determined to be 3.7%.

Example 7

Preparation of a Flame-Retardant Polyester of Formula IV-1 (Silicon-Free)

169.5 g of diethylene glycol and 48.6 g of dipropylene glycol were added into a 3 L round-bottomed reaction flask, and stirred for 30 min at 70° C. Then, 101.4 g of phthalic anhydride (that is, a monomer (B1)) and 1000.1 g of 10-(2,5-dicarboxypropyl)-9,10-dihydro-9-oxa-10-phosphaphenanthrene-10-oxide were added to the reaction flask, and reacted at 200° C. till the acid value was 65 to 75 and the viscosity was 550 to 650 (detected by a high-temperature viscosity meter, #3, 150° C., 750 rpm). Next, 0.165 g of 1,4-dihydroxy benzene was added to the reaction flask, 680.4 g of glycidyl methacrylate was added dropwise at 70° C., and then, the temperature was raised to 95° C. and maintained at a constant temperature of 95° C. for 3 h, and the reactants were reacted till the acid value was 25 to 30, and the viscosity was 750 to 850 (detected by a high-temperature viscosity meter, #3, 150° C., 750 rpm) and the viscosity in 35% styrene was V-W (detected by a GARDNER viscosity meter). The silicon-free acrylate-modified phosphorus-containing unsaturated polyester having the structure of Formula IV-1 was thus obtained. The phosphorus content of the phosphorus-containing unsaturated polyester was determined to be 4.1%.

Example 8

Preparation of a Composition of Flame-Retardant Polyesters having the Structures of Formulae IV-1 and IV-2

169.5 g of diethylene glycol and 48.6 g of dipropylene glycol were added into a 3 L round-bottomed reaction flask, and stirred for 30 min at 70° C. Then, 101.4 g of phthalic anhydride (that is, a monomer (B1)) and 1000.1 g of 10-(2,5-dicarboxypropyl)-9,10-dihydro-9-oxa-10-phosphaphenanthrene-10-oxide were added to the reaction flask, and reacted at 200° C. till the acid value was 65 to 75 and the viscosity was 550 to 650 (detected by a high-temperature viscosity meter, #3, 150° C., 750 rpm). Next, 0.165 g of 1,4-dihydroxy benzene was added to the reaction flask, 680.4 g of glycidyl methacrylate was added dropwise at 70° C., and then, the temperature was raised to 95° C. and maintained at a constant temperature of 95° C. for 3 h, and the reactants were reacted till the acid value was 25 to 30, and the viscosity was 750 to 850 (detected by a high-temperature viscosity meter, #3, 150° C., 750 rpm) and the viscosity in 35% styrene was V-W (detected by a GARDNER viscosity meter). The silicon-free acrylate-modified phosphorus-containing unsaturated polyester having the structure of Formula I was thus obtained. Then, the temperature of the reaction flask was decreased to 45° C., and next, 60 g of 3-glycidoxypropyltrimethoxysilane was added dropwise into the reaction flask, and the reactants were reacted for 2 h till the acid value was 15 to 20 and the viscosity in 35% styrene was X-Y (detected by a GARDNER viscosity meter). The acrylate-modified silicon- and phosphorus-containing unsaturated polyesters having the structures of Formulae IV-1 and IV-2 were thus obtained. The phosphorus content of the phosphorus-containing unsaturated polyester was determined to be 4.0%.

Example 9

Preparation of a Flame-Retardant Polyester of Formula IV-1 (Silicon-Free)

220.0 g of diethylene glycol and 63.1 g of dipropylene glycol were added into a 3 L round-bottomed reaction flask, and stirred for 30 min at 70° C. Then, 577.6 g of phthalic anhydride and 256.2 g of 10-(2,5-dicarboxypropyl)-9,10-dihydro-9-oxa-10-phosphaphenanthrene-10-oxide were added to the reaction flask, and reacted at 200° C. till the acid value was 65 to 75 and the viscosity was 450 to 550 (detected by a high-temperature viscosity meter, #3, 150° C., 750 rpm). Next, 0.165 g of 1,4-dihydroxy benzene was added to the reaction flask, 883.2 g of glycidyl methacrylate was added dropwise at 70° C., and then, the temperature was raised to 95° C. and maintained at a constant temperature of 95° C. for 3 h, and the reactants were reacted till the acid value was 25 to 30, and the viscosity was 550 to 650 (detected by a high-temperature viscosity meter, #3, 150° C., 750 rpm) and the viscosity in 35% styrene was S-T (detected by a GARDNER viscosity meter). The silicon-free acrylate-modified phosphorus-containing unsaturated polyester having the structure of Formula IV-1 was thus obtained. The phosphorus content of the phosphorus-containing unsaturated polyester was determined to be 1.09%.

Example 10

Preparation of a Composition of a Flame-Retardant Polyester having the Structure of Formula I 169.5 g of diethylene glycol and 48.6 g of dipropylene glycol were added into a 3 L round-bottomed reaction flask, and stirred for 30 min at 70° C. Then, 101.4 g of phthalic anhydride (that is, a monomer (B1)) and 1000.1 g of 10-(2,5-dicarboxypropyl)-9,10-dihydro-9-oxa-10-phosphaphenanthrene-10-oxide were added to the reaction flask, and reacted at 200° C. till the acid value was 65 to 75 and the viscosity was 550 to 650 (detected by a high-temperature viscosity meter, #3, 150° C., 750 rpm). Next, 0.165 g of 1,4-dihydroxy benzene was added to the reaction flask, 680.4 g of glycidyl methacrylate was added dropwise at 70° C., and then, the temperature was raised to 95° C. and maintained at a constant temperature of 95° C. for 3 h, and the reactants were reacted till the acid value was 25 to 30, and the viscosity was 750 to 850 (detected by a high-temperature viscosity meter, #3, 150° C., 750 rpm) and the viscosity in 35% styrene was V-W (detected by a GARDNER viscosity meter). The silicon-free acrylate-modified phosphorus-containing unsaturated polyester having the structure of Formula I was thus obtained. Then, the temperature of the reaction flask was decreased to 45° C., and next, 73.2 g of 2-(3,4-epoxycyclohexyl)ethyltriethoxysilane

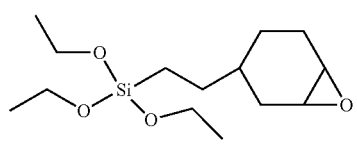 [SMILES: CCO[Si](CCC1CCC2OC2C1)(OCC)OCC]

was added dropwise into the reaction flask, and the reactants were reacted for 2 h till the acid value was 15 to 20 and the viscosity in 35% styrene was X-Y (detected by a GARDNER viscosity meter). The acrylate-modified silicon- and phosphorus-containing unsaturated polyesters having the structure of Formula I were thus obtained. The phosphorus content of the phosphorus-containing unsaturated polyesters were determined to be 3.7%.

[Flame Resistance Test, Film Forming Ability Test, Adhesion Test and Film Hardness Experiment]

The flame-retardant polyesters obtained in Example 1 to Example 10 were subjected to a flame retardant test, a film forming ability test, an adhesion test and a film hardness experiment. The flame retardant test was performed on a resin according to the UL94 standard. The film forming ability test was performed in the following manner: 65 parts by weight of modified flame-retardant polyester, 35 parts by weight of styrene, 6 parts by weight of cobalt isooctoate and 1 part by weight of methyl ethyl ketone peroxide (MEKPO) were mixed, the resulting mixture was coated on a PET substrate and cured to form a film having a thickness of 500 micrometers, the film forming ability and the smooth degree were observed, and the resulting product having no warping was preferred. The adhesion test was performed in the following manner: 100 parts by weight of modified flame-retardant polyester, 6 parts by weight of cobalt isooctoate and 1 part by weight of methyl ethyl ketone peroxide (MEKPO) were mixed, the resulting mixture was coated on two same composite materials (length×width×height: 25 cm×25 cm×3 mm), the two materials are adhered face to face in a range having a length of 25 cm and a width of 25 cm at an overlapped endpoint, and a temporary storage material (a PET film) was placed in other parts of the binding surface. After curing, the temporary storage material was removed to form a drawing area, and the adhesion was tested by a drawing method. The adhesion was classified into three levels: excellent (having no torn plastic surface, almost having no torn plastic surface or having a slightly torn plastic surface), good (having a torn plastic surface in a certain range), poor (most of the plastic surface was torn or the plastic surface was completely separated from the composite material. The film hardness experiment is to test the pencil hardness by the JIS K5400 standard method (the substrate was polyethylene terephthalate (PET)/wood board). The results are shown in Table 1:

TABLE 1

| | Type | UL-94 | Film forming ability | Adhesion | Hardness (PET/wood board) |
|---|---|---|---|---|---|
| Example 1 | silicon-free | V0 | excellent | good | 4H/4H |
| Example 2 | silicon-containing | V0 | excellent | excellent | 4H/4H |
| Example 3 | silicon-free | V0 | excellent | good | 4H/4H |
| Example 4 | silicon-containing | V0 | excellent | excellent | 4H/4H |
| Example 5 | silicon-free | V0 | excellent | good | 4H/4H |
| Example 6 | silicon-containing | V0 | excellent | excellent | 4H/4H |
| Example 7 | silicon-free | V0 | excellent | good | 4H/4H |
| Example 8 | silicon-containing | V0 | excellent | excellent | 4H/4H |
| Example 9 | silicon-free | V1 | excellent | good | 4H/4H |
| Example 10 | silicon-containing | V0 | excellent | excellent | 4H/4H |

As shown in Table 1, regardless of whether the flame-retardant polyesters and the compositions of the flame-retardant polyester of the present invention contain silicon, under the condition that the phosphorusus content is greater than 1.5%, the flame-retardant polyesters and the compositions of the flame-retardant polyester can pass the flame retardant test of UL-94 V0 level, have excellent flame resistance, and when being used in coatings, the coatings have excellent film forming ability, and the hardness of the resulting films is no less than 4H. All the compositions of the silicon-containing flame-retardant polyester have excellent results in the adhesion test.

The above embodiments are merely for the purpose of exemplarily describing the principles and efficacies of the present invention and explaining the technical features of the present invention, but are not intended to limit the present invention. Thus, modifications or variations made by those skilled in the art to the above embodiments without departing from the spirit of the present invention shall fall within the scope of the present invention as specified in the following claims.

What is claimed is:

1. A flame-retardant polyester having a structure of Formula I:

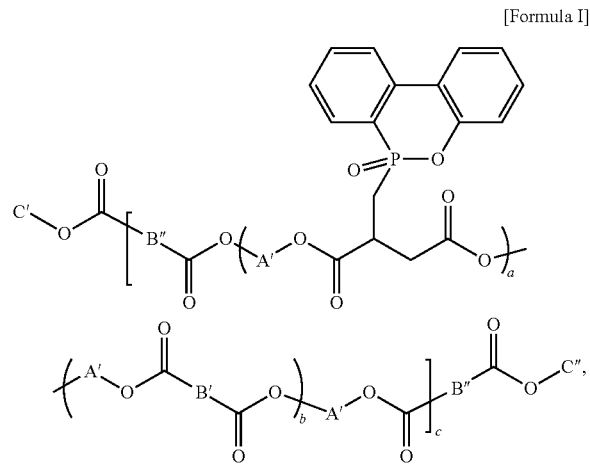

[Formula I]

wherein each A' is, independently, a residue of a diol, each B' and each B" may be identical or different and are, independently, a residue of a saturated or unsaturated anhydride or acid, C' and C" may be identical or different and are, independently, hydrogen, a residue of an epoxy acrylate compound or a residue of an epoxy silicon-containing compound, with the proviso that C' and C" are not both hydrogen, wherein a is an integer of from 1 to 30, b is an integer of from 1 to 30, c is an integer of from 1 to 15, and wherein the flame-retardant polyester has an acid value of from 20 to 40, wherein the epoxy silicon-containing compound is

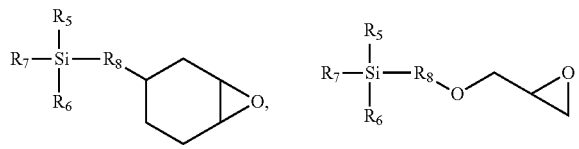

or a combination thereof, wherein $R_5$ and $R_6$ are, independently, a C1 to C5 linear or branched alkyl group, a C1 to C15 linear or branched alkoxy group or

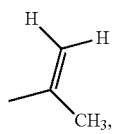

$R_7$ is a C1 to C15 linear or branched alkyl group, a C1 to C15 linear or branched alkoxy group or

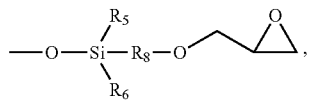

and $R_8$ is a C1 to C15 linear or branched alkylene group, a polyether group or an arylene group.

2. The flame-retardant polyester according to claim 1, wherein the diol is selected from the group consisting of ethylene glycol, diethylene glycol, propylene glycol, dipropylene glycol, neopentyl glycol, polyethylene glycol, styrene diol, hexanediol, butanediol, 1-phenyl-1,2-ethylene glycol, 2-bromo-2-nitro-1,3-propylene glycol, 2-methyl-2-nitro-1, 3-propylene glycol, diethyl bis(hydroxymethyl)malonate, hydroquinone and 3,6-dithio-1,8-octanediol and a combination thereof.

3. The flame-retardant polyester according to claim 1, wherein the saturated anhydride or acid is selected from the group consisting of phenylsuccinic acid, benzylmalonic acid, 3-phenylglutaric acid, 1,4-phenyldiacetic acid, 1,2-phenyldiacetic acid, oxalic acid, malonic acid, succinic acid, pyromellitic dianhydride, 3,3',4,4'-benzophenone-tetracarboxylic dianhydride, naphthalene dianhydride, 1,4,5,8-naphthalene-tetracarboxylic dianhydride, cyclobutane-tetracarboxylic dianhydride, 2,3-anthracene dicarboxylic anhydride, 3,4,9, 10-tetracarboxylic anhydride, 1,2,3,4-butane-tetracarboxylic dianhydride, 1,2,3,4-cyclopentane-tetracarboxylic dianhydride, phenylglutaric anhydride, adipic anhydride, 3,3-dimethylglutaric anhydride, phenylsuccinic anhydride, hexahydrophthalic anhydride and a compound having a structure selected from the following:

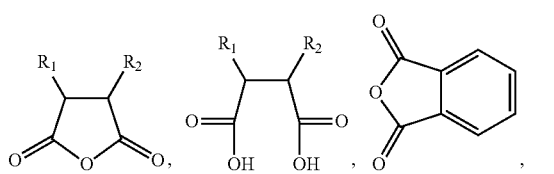

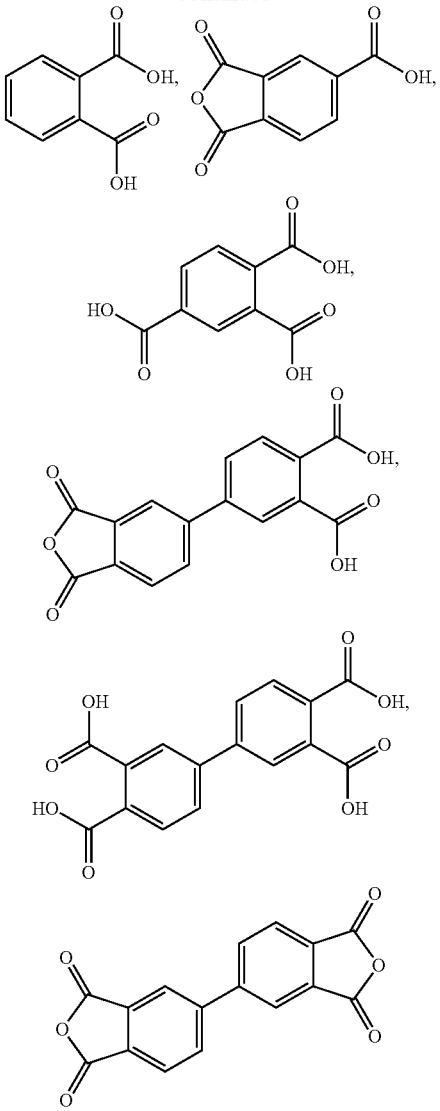

and a combination thereof, wherein $R_1$ and $R_2$ are, independently, H or a substituted or an unsubstituted C1 to C15 hydrocarbon radical.

4. The flame-retardant polyester according to claim 1, wherein the unsaturated anhydride or acid is selected from the group consisting of

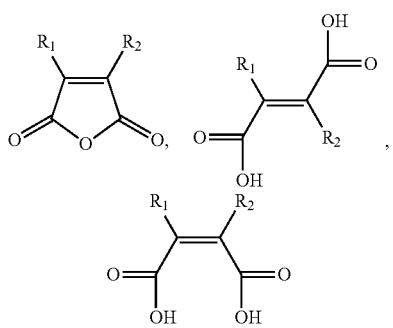

and a combination thereof, wherein R₁ and R₂ are, independently, H or a substituted or an unsubstituted C1 to C15 hydrocarbon radical.

5. The flame-retardant polyester according to claim 1, wherein the epoxy acrylate compound is glycidyl (meth) acrylate, 3,4-epoxycyclohexylmethyl (meth)acrylate or

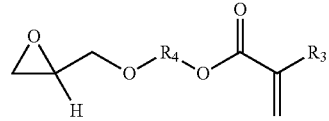

or a combination thereof, wherein R₃ is H or methyl, R₄ is a C1 to C15 linear or branched alkylene group or a group selected from the group consisting of the following

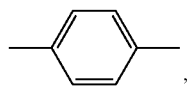

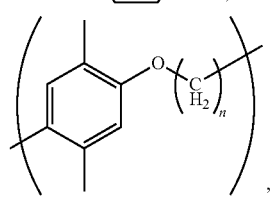

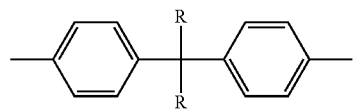

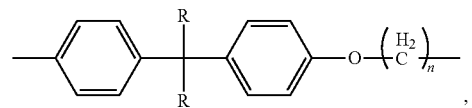

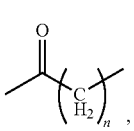 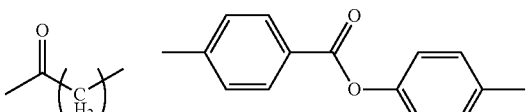

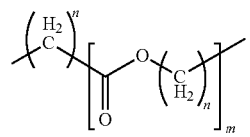

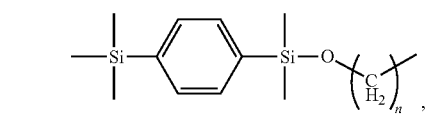

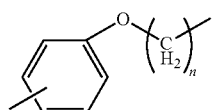

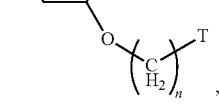

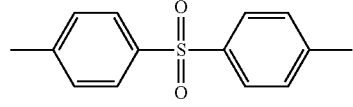

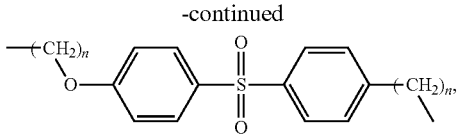

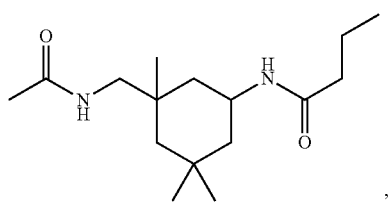

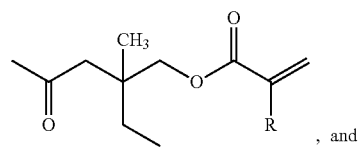

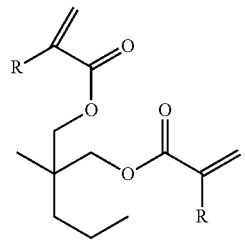

wherein n is an integer of from 1 to 15, m is an integer of from 1 to 10, R is H or methyl, and T is

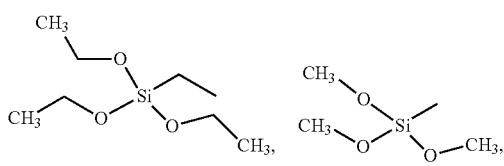

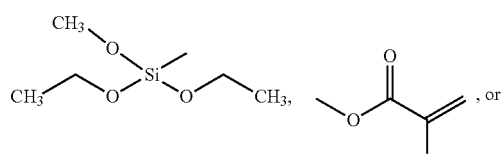

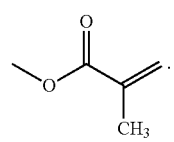

6. A coating composition, comprising the flame-retardant polyester according to claim 1, a vinyl monomer and a polymerization initiator.

7. A method for preparing the flame-retardant polyester according to claim 1, comprising:
(a) subjecting at least one diol, at least one saturated or unsaturated anhydride or acid, and

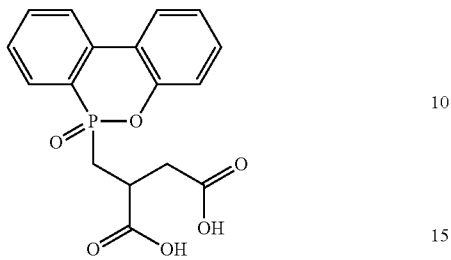

to a polymerization reaction;
(b) further reacting at least one saturated or unsaturated anhydride or acid with the product of Step (a);
(c) modifying the product of Step (b) with an epoxy acrylate compound or epoxy silicon-containing compound; and
(d) after the reaction in Step (c) is completed, optionally adding an epoxy silicon-containing compound for modification.

8. The method according to claim 7, wherein in Step (b), at least one unsaturated anhydride or acid is used to react with the product of Step (a).

9. The method according to claim 7, wherein in Step (c), the product of Step (b) is modified by an epoxy acrylate compound.

* * * * *